United States Patent [19]

Jack et al.

[11] Patent Number: 4,541,938
[45] Date of Patent: Sep. 17, 1985

[54] CONTINUOUS OVERBASING OF PETROLEUM SULFONATE WITH WATER REMOVAL AND METHANOL ADDITION BETWEEN REACTION STAGES

[75] Inventors: Douglas S. Jack; James W. Garner, both of Bartlesville, Okla.

[73] Assignee: Phillips Petroleum Company, Bartlesville, Okla.

[21] Appl. No.: 594,651

[22] Filed: Mar. 28, 1984

[51] Int. Cl.$^4$ .............................................. C10M 1/40
[52] U.S. Cl. ........................................ 252/33; 252/18
[58] Field of Search ................................... 252/18, 33

[56] References Cited

U.S. PATENT DOCUMENTS

| | | | |
|---|---|---|---|
| 3,076,841 | 2/1963 | Hutchings et al. | 252/33 |
| 3,105,049 | 9/1963 | Voorhees | 252/33 |
| 3,318,809 | 5/1967 | Bray | 252/33 |
| 3,323,630 | 6/1967 | Fowler et al. | 198/19 |
| 3,523,899 | 8/1970 | De Vault | 252/33 |
| 4,165,291 | 8/1979 | Gragson | 252/33 |

Primary Examiner—Jacqueline V. Howard
Attorney, Agent, or Firm—A. W. Umphlett

[57] ABSTRACT

A method and apparatus for the continuous overbasing of petroleum sulfonate providing in a process in which $CO_2$ is contacted with a reaction mixture of neutral petroleum sulfonate, lube oil stock, lime, methanol, and naphtha in a series of reaction vessels in which additional $CO_2$ is contacted seriatim in each succeeding reaction vessel with the effluent from the preceding reaction vessel, a method and apparatus for the removal of at least a portion of the effluent from each reaction vessel with the reduction of water content in this portion and subsequent supplementing of methanol content in this portion to provide a reaction efficient amount of water and methanol in each succeeding reaction.

6 Claims, 1 Drawing Figure

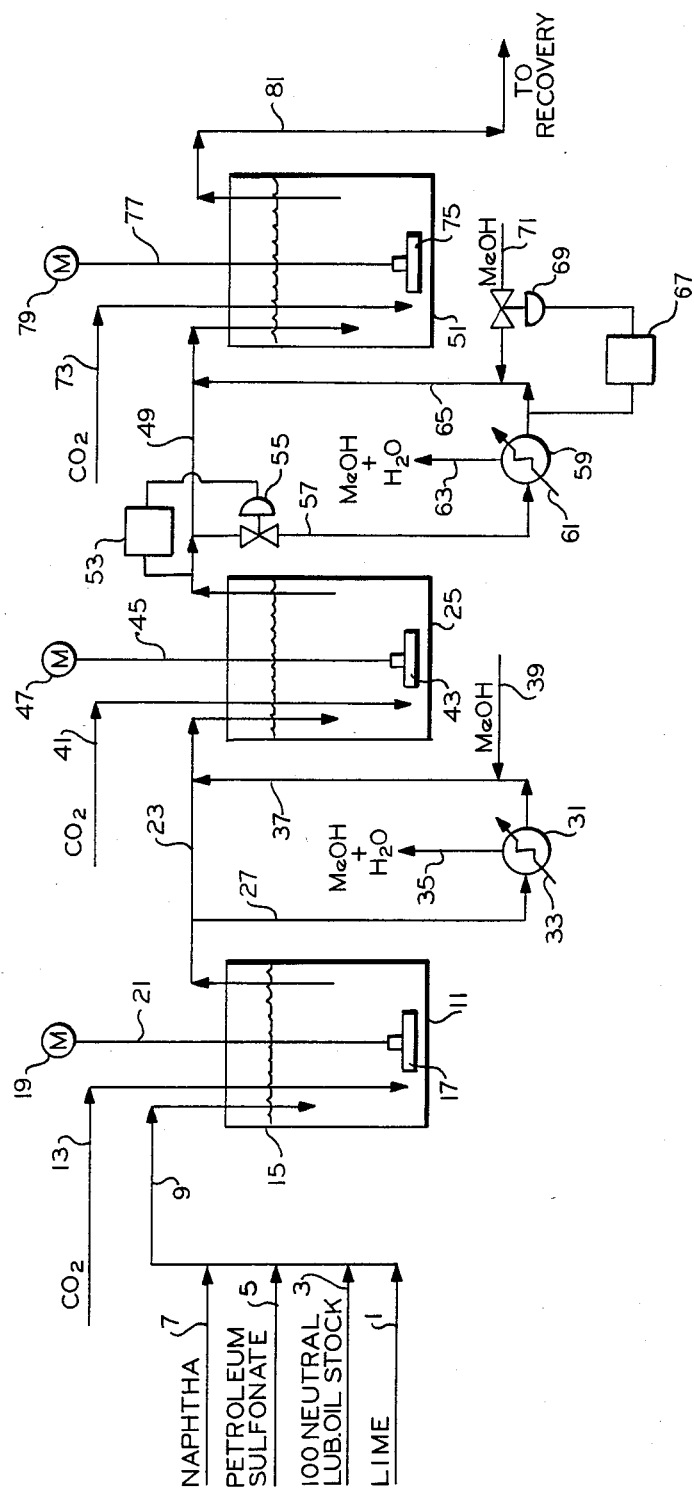
FIG. I

CONTINUOUS OVERBASING OF PETROLEUM SULFONATE WITH WATER REMOVAL AND METHANOL ADDITION BETWEEN REACTION STAGES

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps or process conditions, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engines.

It is known that equivalent detergency characteristics can be obtained with a lower concentration of additive in a lubricating oil—the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has now been found that in a continuous process for overbasing petroleum sulfonate using multiple reactors that it is important to maintain water, which is a product of the reaction, at an amount of about 1.5 percent by weight in the reaction mixture. At levels above this amount, depending on the reaction temperature, water becomes detrimental to the reaction and should be removed to provide the most efficient reaction. Removal of water usually involves the simultaneous removal of methanol (MeOH), an essential component of the reaction mixture. Any process removing water should, therefore, also provide for supplementing the MeOH after water removal.

It is therefore an object of this invention to provide an overbased calcium petroleum sulfonate having high alkaline reserve. It is another object of this invention to provide lubricating additive containing overbased calcium petroleum sulfonate having high alkaline reserve. It is another object of the invention to provide a process for preparing an overbased calcium petroleum sulfonate having high alkaline reserve. It is still another object of this invention to provide a process for preparing a lubricating additive containing overbased calcium petroleum sulfonate having a high alkaline reserve.

Other aspects, concepts, and objects of this invention along with its several advantages will be apparent from a study of this disclosure and the appended claims.

STATEMENT OF THE INVENTION

According to this invention, a method is provided for the continuous overbasing of petroleum sulfonate in which (1) $CO_2$ is contacted with a reaction mixture of (a) neutral petroleum sulfonate, (b) 100 neutral lube oil stock (100 SUS at 100° F.), (c) $Ca(OH)_2$, (d) MeOH, and (e) naphtha in a series of reaction vessels with the effluent from each reaction vessel being contacted seriatim in the next succeeding reaction vessel with $CO_2$; (2) removing at least a portion of the effluent from each reaction vessel; (3) reducing the water content of the portion of effluent to reduce inhibition of the reaction; (4) subsequently supplementing the MeOH content of the portion of effluent from which water has been removed to provide a more reaction efficient amount of methanol in the succeeding reactors; (5) introducing the portion of effluent from which water has been removed and which has been supplemented in methanol content into the next succeeding reactor; and (6) collecting overbased petroleum sulfonate reaction product from the last succeeding reactor.

In an embodiment of this invention apparatus is provided by which the effluent reactor product from a reaction zone for the continuous overbasing of petroleum sulfonate is treated for the removal of excess water and after the removal of excess water, which also removes methanol, provides means for supplementing the methanol content of the treated effluent stream before it is introduced as feed into the next subsequent reactor in the seriatim, continuous process.

This invention provides a continuous process for producing a detergent-dispersive additive for motor oils by reacting carbon dioxide ($CO_2$) with lime $Ca(OH)_2$ in the presence of methanol and simultaneously dispersing the resultant calcium carbonate ($CaCO_3$) in a 50/50 mixture of calcium petroleum sulfonate and 100 neutral stock lubricating oil. The reaction is carried out in naphtha solvent. The product is then stripped of water and methanol, filtered to remove the solids and stripped of naphtha. The finished product is a colloidal dispersion of $CaCO_3$ in a range of about 27 to about 30 weight percent usually about 27 weight percent in the 50/50 calcium petroleum sulfonate/100 neutral stock mixture.

Although overbased petroleum sulfonates can be produced in a series of three continuous stirred tank reactors such a system is found to be insufficiently tolerant of feedstock variations to be commercially feasible unless inter-reactor removal of water and MeOH with supplemental MeOH added to replace inter-reactor loss of MeOH is made.

The petroleum sulfonates useful in the present invention can be described as neutral petroleum sulfonate prepared by sulfonating KC-250 bright stock (200 SUS at 210° F.). See U.S. Pat. No. 3,135,693, incorporated here by reference.

The neutral lube oil used in this invention can be described as solvent refined 100 neutral lube oil stock having a viscosity of 100° F.

The lime, calcium hydroxide, useful in the present invention can have a surface area of about 5 to about 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, MO.

The MeOH useful in this invention as promoter/solvent is described as methanol having 0 to 10 weight percent $H_2O$.

The naphtha used in this invention is described as petroleum naphtha with boiling point range 80° C.–300° C.

The $CO_2$ useful in this invention is described as technical grade or more chemically pure $CO_2$.

General reaction conditions to make overbased product having 300 total base number (defined as Mg.KOH equivalent/gram product) are as follows: The temperature for the carbonation reaction can range from 25° C. (77° F.) to 80° C. (176° C.), preferably 35° C. (95° F.) to 65° C. (149° F. ). Pressure of the carbonation reaction can range from 1 psia to 30 psia, preferably 10 to 20 psia. The overbasing (carbonation) rasidence or reaction time can vary from 20 minutes to 120 minutes, preferably 50 to 70 minutes overall.

Feed component concentrations for the carbonation reaction are as follows:

| Component | Weight % of Total Feed | |
| --- | --- | --- |
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium (Petroleum Sulfonate) | 5.0 to 15 | 7 to 12 |
| No. 10 Lubricating Oil Stock | 5.0 to 15 | 7 to 12 |
| Naptha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 weight percent, however, can be detrimental be reducing the base number of the product.

Any apparatus is useful in this invention that is capable of raising the temperature of the reaction mixture to the degree that water is evaporated from the reaction mixture with removal of the water vapor from the apparatus. The removal of water vapor from the reaction mixture will, of course, also cause methanol to be removed. The minimum requirement for supplementing the methanol is an inlet in the line downstream of the water removal apparatus into which methanol can be piped. The preferred apparatus for removal of water from the effluent of the reactors is a dryer consisting of a one stage flash with stripping vapors.

A more sophisticated embodiment of the invention control the flow of effluent into the apparatus for removing water by analyzing the amount of water in the effluent and controlling an inlet valve to the water removal apparatus in response to the amount of water determined to be in the effluent. Similarly, the amount of methanol in the effluent leaving the water removal apparatus is analyzed and the flow of methanol added to this effluent controlled according to the analysis.

The invention can best be understood in conjunction with the drawing which is a schematic representation of the apparatus and process of this invention.

Referring now to the drawing, lime is fed through line (1), 100 neutral lubricating stock through line (3), petroleum sulfonate through line (5) and naphtha through line (7) to be mixed together in inlet line (9) for transfer into a first reactor (11). A first portion of carbon dioxide is fed through line (13) to a point below the liquid level (15) near the agitator blade (17) in the reactor (11). Motor (19) operates through shaft (21) to provide motion to the agitator blade (17). Effluent reactor product is passed through line (23) from the first reactor (11) to the second reactor (25).

According to the present invention, at least a portion of the reactor product effluent is removed from line (23) by line (27) and is passed into heat exchange apparatus (31) where the reactor effluent is indirectly heat exchanged with a hot fluid passing through coil (33) which increases the temperature of the reactor effluent sufficiently that water vapor is discharged through line (35). Not only water vapor, but also methanol is removed through line (35) so that it is necessary in line (37) which returns the reactor effluent from which water vapor has been returned to transfer line (23) to incorporate make up of methanol through line (39) to replace methanol that has been lost in the evaporation apparatus (31).

After the excess water has been removed and the methanol content has been supplemented in at least a portion of the effluent reaction product in line (23), the reactor effluent is passed into second reaction vessel (25) where upon being contacted with carbon dioxide from line (41) the reaction goes forward without the interference that would have resulted from the presence of the reaction product water that was removed in apparatus (31). The reaction mixture continuously stirred by agitator blade (43) attached by shaft (45) to motor (47) is transferred through line (49) to third reactor vessel (51).

The transfer of this reaction product effluent is illustrated with the monitoring of water content in transfer line (49) by analyzer (53) which transmits a signal to motor control valve (55) which dictates the amount of effluent that is allowed to pass through line (57) and into the water removal apparatus (59). Indirect contact with hot fluid in coil (61) flashes water vapor and some of the methanol content through line (63). Line (65) which returns the second reactor product effluent from water removal apparatus (59) to transfer line (49) is monitored by an analyzer (67) which determines the amount of methanol in the stream and controls motor valve (69) which determines the amount of methanol passing through line (71) into the reaction product stream from which water has been removed.

The reactor effluent from the second reactor (25) is passed after the water and methanol contents have been adjusted through line (49) into the third reactor (51) in which it is further reacted with carbon dioxide from line (73) in the continuously stirred reactor which is agitated methanol addition gives total base number (TBN's) from reactor 3 greater than 300 whereas no such water removal would give TBN's less than 300.

TABLE I

EFFECT OF $H_2O$ REMOVAL ON TBN IN CSTR's

| | Reactor 1 | | | | Reactor 2 | | | | Reactor 3 | | | |
|---|---|---|---|---|---|---|---|---|---|---|---|---|
| | % $CO_2$ | Temp | % $H_2O$ | TBN | % $CO_2$ | Temp | % $H_2O$ | TBN | % $CO_2$ | Temp | % $H_2O$ | TBN |
| Run No 1 w/o water removal | 23 | 91° F. | 1.5 | 110 | 31 | 104° F. | 1.8 | 189 | 46 | 119° F. | 2.3 | 271 |
| Run No 2 with water removal | 23 | 91° F. | 1.5 | 110 | 31 | 104° F. | 1.4 | 215 | 46 | 118° F. | 1.5 | 310 |
| Run No 3 w/o water removal | 20 | 105° F. | 1.4 | 104 | 50 | 110° F. | 2.0 | 235 | 30 | 110° F. | 2.8 | 289 |
| Run No 4 with water removal | 20 | 105° F. | 1.4 | 107 | 50 | 110° F. | 1.5 | 247 | 30 | 110° F. | 1.5 | 309 |

Inlet MeOH concentration to each reactor constant @ 4.0 weight percent of total mixture.
$CO_2$ rates were 0.7 mol $CO_2$/mol lime in all cases.

by reactor blade (75) which is attached by shaft (77) to motor drive (79). The reactor product effluent from the third reactor (51) is passed through line (81) to a recovery process which is not a part of this invention but which is illustrated in the description immediately following.

The reaction product is stripped of water and methanol, filtered to remove the solids and stripped of naphtha. The finished product is a colloidal dispersion of $CaCO_3$ in range of about 20 to about 40 weight percent usually about 27 weight percent in 50/50 calcium petroleum sulfonate/100 neutral oil mixture.

In general, the stripping of water and methanol is a well known fractionation in which the following operating conditions are met: At least one or more stages of stripping with steam, nitrogen or other inert gas except $CO_2$ at a maximum of about 250° F. at preferably atmospheric pressure. The methanol/$H_2O$ content of the bottoms product from this stripping step should be at least less than 0.3 weight percent for best filterability.

The filtering of the product from which water and methanol has been removed is carried out by a filtering procedure, such as, preferably a vacuum filtration using a rotary precoated filter, the precoat consisting of diatomaceous earth or the like. This filtration is most effectively carried out between 180°–220° F. and about 12–15 inches Hg up to 26–28 inches Hg vacuum.

The removal of naphtha from the filtered product is accomplished by well known fractionation processes under operating conditions that include: An atmospheric packed or trayed tower which removes 80% of the naphtha followed by a vacuum fractionation to distill overhead the remaining naphtha while preventing the loss of the light ends of the 100 neutral lube oil stock.

Although this invention has been illustrated with a process showing three continuously stirred reactors it should be apparent to one skilled in the art that the reactors may be pipe reactors, continuously stirred reactors or any other form of reactor or combination of reactors that can produce overbased petroleum sulfonate product of this invention.

CALCULATED EXAMPLE

A calculated example showing the effect of removal and non-removal of water with addition of methanol between each of a series of three reactors is estimated by extrapolation and given in Table I. A summary statement may be that water removal with intra-reactor

We claim:

1. A method for the continuous overbasing of petroleum sulfonate comprising:
   (1) contacting $CO_2$ at reaction conditions with a reaction mixture of (a) neutral petroleum sulfonate, (b) solvent refined 100 neutral lube oil stock, (c) lime, (d) methanol, and (e) naphtha in a series of reaction vessels in which additional $CO_2$ is contacted seriatim in each succeeding reaction vessel with the effluent from the preceding reaction vessel,
   (2) removing at least a portion of the effluent from each reaction vessel,
   (3) reducing the water content of said at least a portion of said effluent to produce a reaction mixture of sufficiently reduced water content to reduce inhibition of the succeeding reaction,
   (4) subsequently, supplementing the methanol content of said at least a portion of said effluent to provide a more reaction efficient amount of methanol in the succeeding reactor,
   (5) introducing said at least a portion of said effluent into the succeeding reactor, and
   (6) collecting overbased petroleum sulfonate reaction product from the last succeeding reactor.

2. A method of claim 1 in which the amount of water in the effluent from each reaction vessel is analyzed and the amount of said at least a portion of said effluent removed is controlled according to the analysis and wherein the methanol content of said at least a portion of said effluent after the removal of water is analyzed and the amount of methanol required is automatically provided into the succeeding reactor.

3. A method of claim 1 wherein said reduced water content of step (3) is in a range of up to about 1.5 percent by weight of the total reaction mixture and said reaction efficient amount of methanol of step (4) is in a range of about 2 weight percent to about 10 weight percent of the total reaction mixture.

4. A method of claim 2 wherein said reduced water content of step (3) is in a range of up to about 1.5 percent by weight of the total reaction mixture and said reaction efficient amount of methanol of step (4) is in a range of about 2 weight percent to about 10 weight percent of the total reaction mixture.

5. A method of claim 3 wherein there is a series of three reaction vessels.

6. A method of claim 4 wherein there is a series of three reaction vessels.

* * * * *